United States Patent
Kuo et al.

(10) Patent No.: US 7,652,798 B2
(45) Date of Patent: Jan. 26, 2010

(54) SYSTEM AND METHOD FOR STORING OF PRINT JOB DATA

(75) Inventors: Min Kuo, Irvine, CA (US); Vincent Wu, Irvine, CA (US); Rohit Wadhwa, Tustin, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 1164 days.

(21) Appl. No.: 10/675,341

(22) Filed: Sep. 30, 2003

(65) Prior Publication Data

US 2005/0068580 A1 Mar. 31, 2005

(51) Int. Cl.
G06K 15/02 (2006.01)
H04N 1/387 (2006.01)
H04N 1/21 (2006.01)

(52) U.S. Cl. ............... 358/402; 358/403; 358/1.16; 358/434

(58) Field of Classification Search ........... 358/1.15, 358/1.16, 1.17, 402, 403, 434; 360/72.2
See application file for complete search history.

(56) References Cited

U.S. PATENT DOCUMENTS

| | | | |
|---|---|---|---|
| 5,450,571 A * | 9/1995 | Rosekrans et al. | 703/24 |
| 5,493,634 A | 2/1996 | Bonk et al. | |
| 5,615,015 A * | 3/1997 | Krist et al. | 358/296 |
| 5,930,465 A * | 7/1999 | Bellucco et al. | 358/1.15 |
| 6,356,357 B1 * | 3/2002 | Anderson et al. | 358/1.17 |
| 6,567,180 B1 | 5/2003 | Kageyama et al. | |
| 6,633,400 B1 * | 10/2003 | Sasaki et al. | 358/1.15 |
| 7,092,117 B2 * | 8/2006 | Kageyama et al. | 358/1.18 |
| 7,200,748 B2 * | 4/2007 | Kim et al. | 713/168 |
| 7,251,047 B2 * | 7/2007 | Meade, II | 358/1.13 |
| 2002/0015180 A1 | 2/2002 | Tominaga | |
| 2002/0046238 A1 | 4/2002 | Estavillo et al. | |
| 2002/0063877 A1 | 5/2002 | Lucivero et al. | |
| 2002/0186393 A1 | 12/2002 | Pochuev et al. | |
| 2002/0196460 A1 | 12/2002 | Parry | |
| 2002/0196467 A1 | 12/2002 | Delhoune et al. | |
| 2002/0196468 A1 | 12/2002 | Klassen et al. | |
| 2003/0086098 A1 | 5/2003 | Sesek et al. | |

(Continued)

OTHER PUBLICATIONS

The Internet Engineering Task Force (IETF), "RFC 1939 Post Office Protocol Version 3", Jan. 24, 2007, pp. 1-7, 19.*

*Primary Examiner*—Twyler L Haskins
*Assistant Examiner*—Myles D Robinson
(74) *Attorney, Agent, or Firm*—Tucker Ellis & West LLP

(57) ABSTRACT

This invention is directed to a system and method for storing print jobs. The system and method comprise acquiring print job data representative of a desired print job, which print job data is comprised of a PDL format associated with a selected printer device and selectively storing the print job data in a selected storage location or cabinet in a storage medium. The system and method further comprises acquiring print status information including data representative of a name associated with the print job data and data representative of a size of the print job data and selectively storing the print status information associatively with the print job data. The system and method also comprises selectively communicating the print job data to generate an image for display in an associated display device and selectively communicating the print job data to the selected printer device to obtain a printout thereof.

16 Claims, 4 Drawing Sheets

U.S. PATENT DOCUMENTS

2003/0086117 A1   5/2003   Lester et al.
2003/0095284 A1   5/2003   Parry
2003/0097948 A1   5/2003   Bhatti
2004/0190042 A1*  9/2004   Ferlitsch et al. ............ 358/1.15

* cited by examiner

SYSTEM AND METHOD FOR STORING OF PRINT JOB DATA

BACKGROUND OF THE INVENTION

This invention is directed to a system and method for storing print job data. More particularly, this invention is directed to a system and method for storing frequently printed documents in a page description language format in a storage location or cabinet to reduce the amount of hard drive space used.

In a work environment or other settings, many documents are printed frequently without any changes made to the content. These documents are generally stored on the printer controller or other suitable storage medium. However, these documents are generally saved after raster image processing and are saved as image files. Saving a document as an image file requires a large amount of storage space. Controllers and other suitable storage mediums have limited space for storing documents which creates a problem for storing large numbers of image files. In addition, printing an image file requires much processing as the image file must be converted to a face file again.

It is desirable to have a system and method for storing frequently printed documents in a manner which does not require a large amount of storage space or processing time.

SUMMARY OF THE INVENTION

In accordance with the present invention, there is provided a system and method for storing frequently printed documents in a manner which does not require a large amount of storage space or processing time.

Further, in accordance with the present invention, there is provided a system and method for storing frequently printed documents in a page description language format in a storage location or cabinet to reduce the amount of storage space required.

Still further, in accordance with the present invention, there is provided a system for storing of print job data comprising means adapted for acquiring print job data representative of a desired print job, which print job data is comprised of a page description language format associated with a selected printer device, storage means adapted for selectively storing the print job data in a selected storage location or cabinet, and means adapted for acquiring print status information including data representative of a name associated with the print job data and data representative of a size of the print job data. The storage means includes means adapted for selectively storing the print status information associatively with the print job data. The system also comprises means adapted for selectively communicating the print job data to generate an image for display in an associated display device and means adapted for selectively communicating the print job data to the selected printer device to obtain a printout thereof.

Still further, in accordance with the present invention, there is provided a method for storing of print job data comprising the steps of acquiring print job data representative of a desired print job, which print job data is comprised of a page description language format associated with a selected printer device and selectively storing the print job data in a selected storage location or cabinet in a storage medium. The method further comprises acquiring print status information including data representative of a name associated with the print job data and data representative of a size of the print job data and selectively storing the print status information associatively with the print job data. The method also comprises selectively communicating the print job data to generate an image for display in an associated display device and selectively communicating the print job data to the selected printer device to obtain a printout thereof.

In a preferred embodiment, the system and method comprise multiple storage locations or cabinets for storing print job data. In one embodiment, a default storage location is selected by an administrative user or other suitable means for storing print job data. In another embodiment, an associated user selects a desired storage location or cabinet for storing print job data associated with the user. Preferably, the parameters for the print job are selected by the user by any suitable means. In addition, in a preferred embodiment, the print job data stored in at least one storage location is displayed.

These and other aspects, features, and advantages of the present invention will be understood by one skilled in the art upon reading and understanding the specification.

DETAILED DESCRIPTION OF THE PREFERRED EMBODIMENTS

This invention is directed to a system and method for storing print job data in a specified storage location or cabinet. The system and method store frequently printed documents in a suitable page description language format to a storage location or cabinet to reduce the amount of hard drive space used, as well as to provide a mechanism for quickly generating additional high-quality printouts as is particularly useful for frequently printed documents. Although discussed with reference to printer devices and print jobs, the system and method of the present invention is suitable for any image generating device and imaging job to optimize routing of the imaging jobs to the image generating device on the network available and having the smallest queue.

Figure 1:
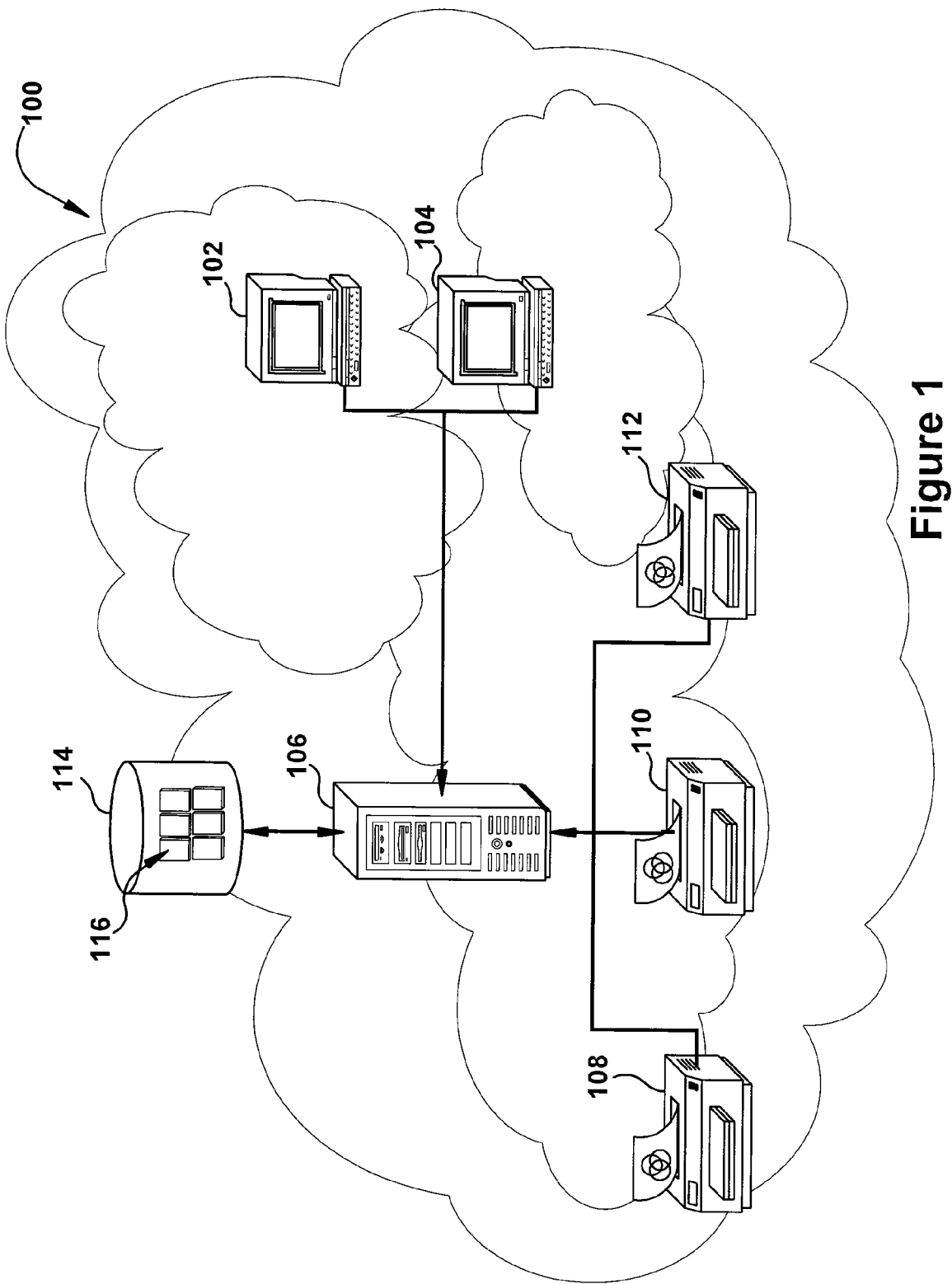
FIG. 1 is a block diagram depicting an exemplary network for the method and implementation of the present invention.

An exemplary network 100 is shown in FIG. 1 for deploying the method and implementation of the present invention. One or more client machines, as illustrated by machines 102 and 104, send print job requests which are received and responded to by controller/server 106. A suitable client machine is any suitable networked computer or data terminal as will be appreciated by one of ordinary skill in the art. The print job requests include a request to store the print job to a storage location. The controller governs access to the printer devices 108, 110, 112 attached to the network. The controller includes a storage medium for storing print jobs shown as 114. The storage medium comprises at least one specified storage location or cabinet 116. Preferably, the storage medium comprises up to sixty four storage locations or cabinets. Once the controller receives the print job request to store the print job to a storage location, the controller stores the print job in the specified storage location. When the controller receives the request to print the print job, the controller then routes the print job to the printer device and the printer device prints the print job.

Figure 2:
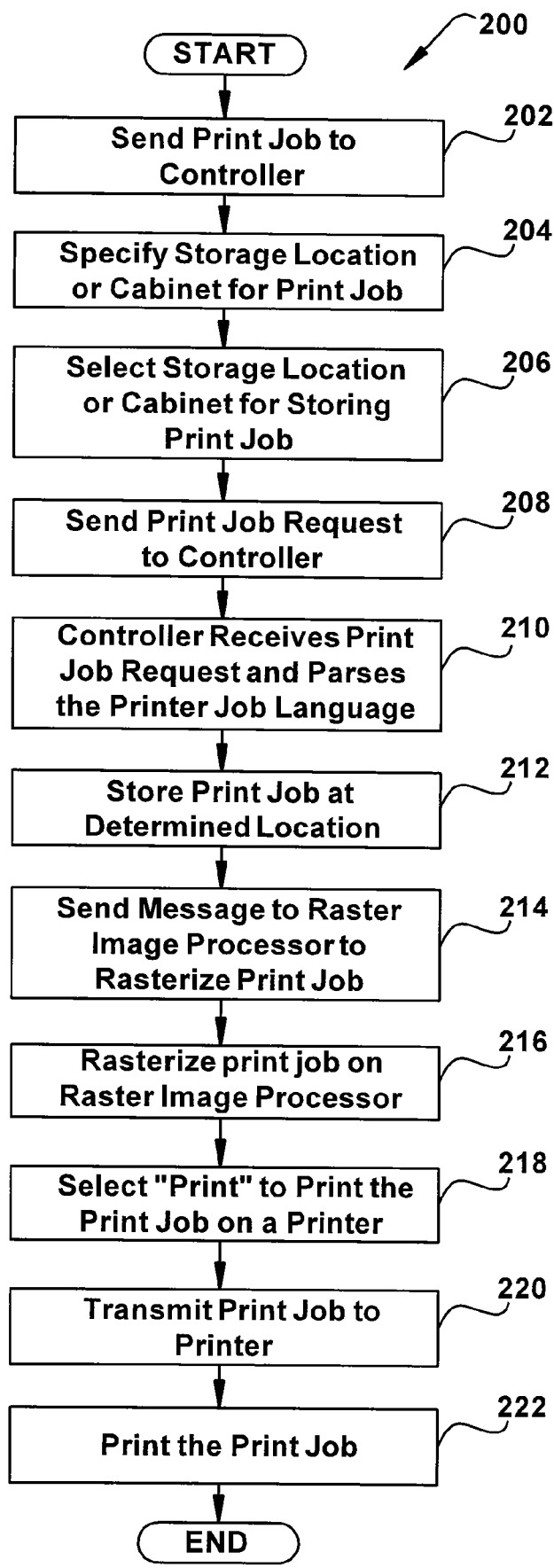
FIG. 2 is a flow chart illustrating the method according to the present invention.
Figure 3:
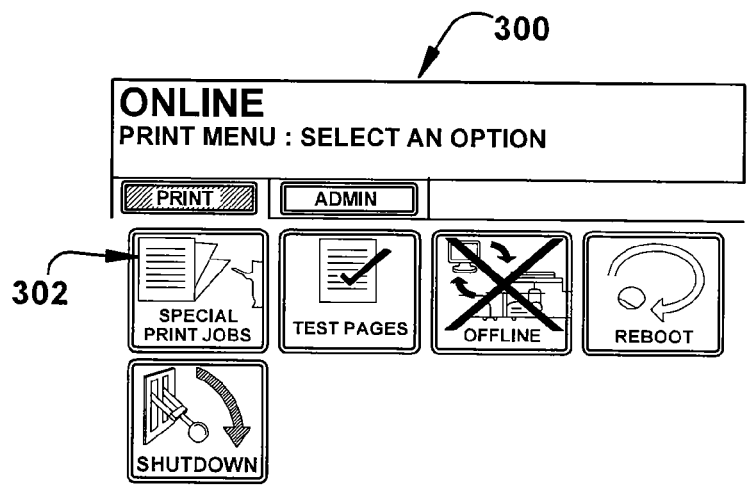
FIG. 3 is sample template for selecting special printing options according to the present invention.
Figure 4:
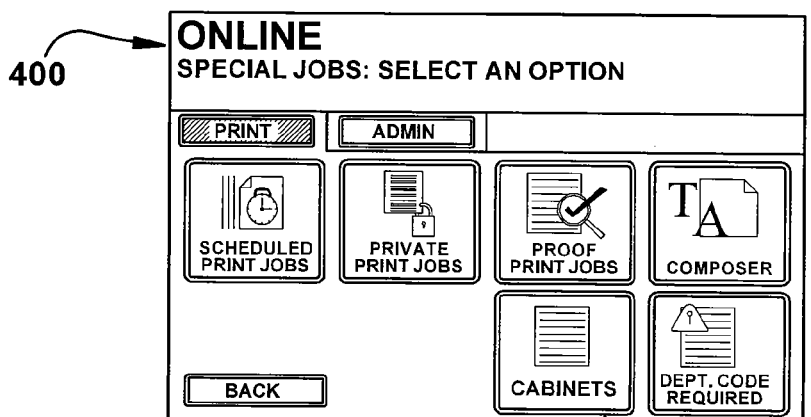
FIG. 4 is a sample template for selecting storing the print job data in a storage location or cabinet.

FIG. 2 shows a flow chart 200 illustrating the method according to the present invention. At 202, an associated user sends a print job request to the controller via any suitable means. The user specifies in the print job request that the print job should be printed to a storage location or cabinet as shown at 204. FIG. 3 shows a sample template 300 for selecting special printing options available to the user. The user selects the option Special Print Jobs 302. Once the option Special Print Jobs is selected, the user selects the available special print jobs. FIG. 4 shows a sample template 400 for selecting the special print jobs. The user selects the option Cabinets 402 to store the print job in a storage location or cabinet.

At 206, the storage location or cabinet is selected in which the print job will be stored. In one embodiment, a default storage location is selected by any suitable means, such as by an administrative user. In one embodiment, the default storage location stores all print jobs that have requested the option to print to a storage location. In another embodiment, the default storage location is suitably associated with at least one associated user. All print jobs from that at least one user that have requested the option to print to a storage location are stored in that storage location.

Figure 5:
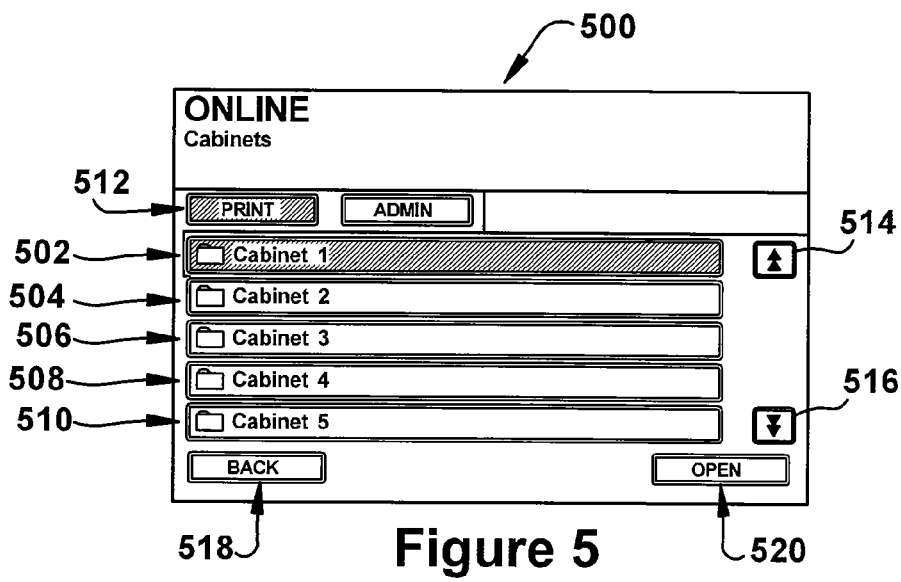
FIG. 5 is a sample template for selecting the storage location to store the print job data.

In another embodiment, the storage location or cabinet in which to store the print job is selected by the user via any suitable means. FIG. 5 shows a sample template 500 for selecting the storage location or cabinet to store the print job. The user selects the desired storage location or cabinet 502, 504, 506, 508, and 510 to store the print job. The user may scroll up and down the display for additional storage locations by using the up arrow 514 and the down arrow 516. The user then selects Print 512 to store the print job to that cabinet. The user may return to the previous screen by selecting Back 518.

In a preferred embodiment, the storage locations or cabinets are password protected. In this embodiment, the user is prompted for the appropriate password by any suitable means. The user then enters the password by any suitable means. If the user does not enter the password correctly, the user may not access the storage location or cabinet or store any print jobs in that storage location or cabinet.

At 208, the print job for printing to a storage location or cabinet is sent to the controller. The print job request and storage location information are sent as part of the printer job language.

The controller receives the print request at 210 and parses the printer job language for the specified job type to print or store the print job in a storage location or cabinet. At 212, the controller stores the print job in the desired located. The controller either uses the default storage location or the storage location selected by the user. In either event, the controller stores the print job in the specified storage location or cabinet in page description language or other suitable format.

At 214, the job manager or other suitable means sends a message via any suitable means to the raster image processor to perform raster image processing on the print job. At 216, the raster image processor performs raster image processing on the print job without creating image files and updates the print job status associated with the print job in the storage location or cabinet.

The print job may be printer by a printer device attached to the network at any time. To print the print job, the user selects the option to print the print job to an associated printer device by any suitable means as shown at 218. Preferably, the user selects a storage location from which a document is to be printer by any suitable means. As shown in FIG. 5, the user selects the storage location from 502, 504, 506, 508, and 510. Once the user has selected the storage location, the user selects the Open button 520 to display the contents of the storage location.

Figure 6:
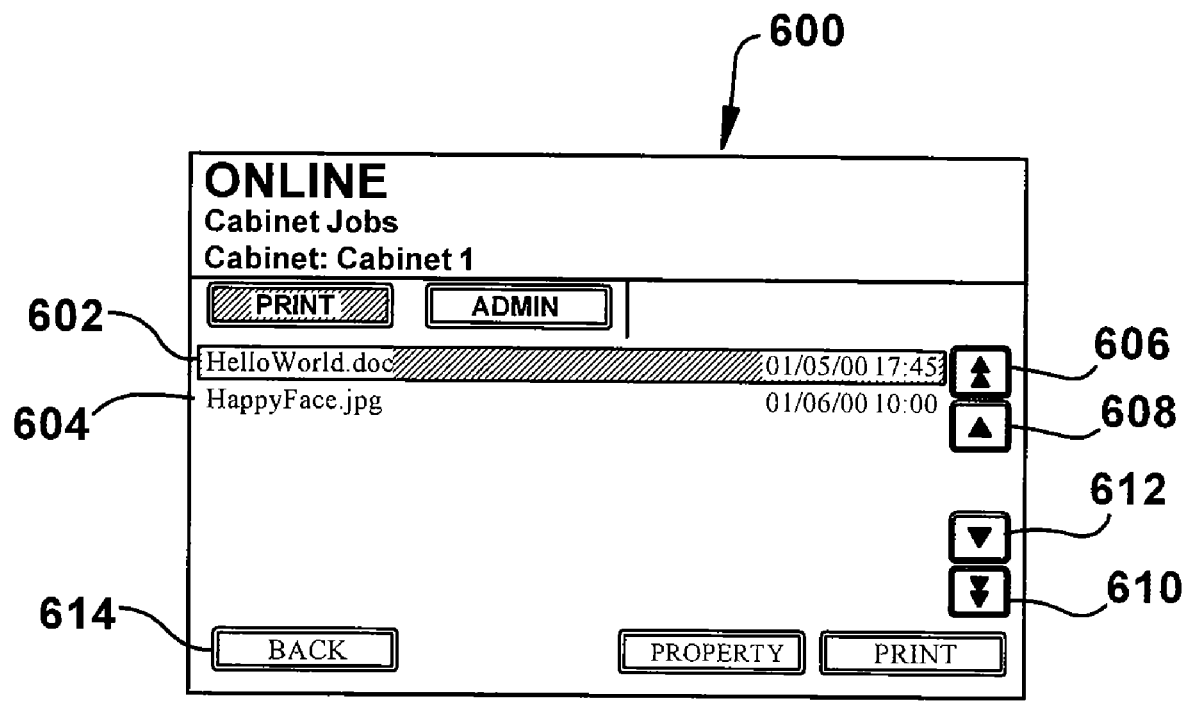
FIG. 6 is a sample template for selecting the print job data within a storage location for printing or modifying the parameters associated therewith.

The user then selects the desired print job stored in the storage location. FIG. 6 is a sample template 600 for selecting the print job to be printed. The user selects the desired print job from 602 and 604 as shown. The user may scroll up and down the display for additional print jobs by using the up arrows 606, 608 and the down arrows 610, 612. In a preferred embodiment, the print jobs are sorted on the display by any suitable means by name or date and time. Once the user has selected the print job to be printed, the user selects Print to print the print job with the settings and options as specified in the page description language for the print job. The user may return to the previous screen to select a different storage location by selecting the Back button 614.

The print job is transmitted to the printer device as shown at 220 and the print job is printed by the printer device as shown at 222.

Figure 7:
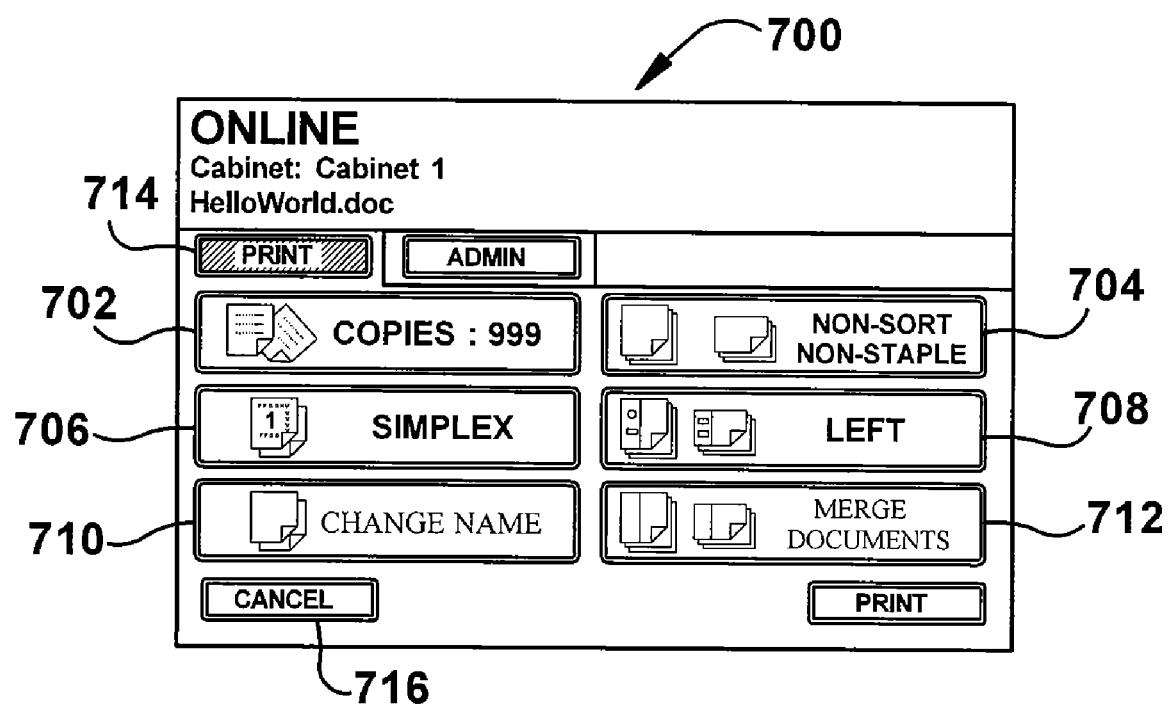
FIG. 7 is a sample template for selecting the parameters for a print job.

In a preferred embodiment, the user is able to select the parameters for the print job to be stored in the storage location by any suitable means. As shown in FIG. 6, the user selects the print job 602, 604 for which the parameters are to chosen. Once the user has selected the print job, the user selects the Properties button 616. FIG. 7 shows a sample template 700 for selecting the parameters. The user may select the number of copies 702 wherein the user inputs a desired number by any suitable means. The user may select the stapling options by selecting button 704. The user may select the printing method, such as simplex, by selecting button 706. The user may select the alignment of the hole punching by selecting button 708. The user may change the name of the print job by selecting button 710. The user may also merge two print jobs by selecting button 712. The user may then print the print job with current settings by selecting Print 714. The user may also cancel the settings entered by selecting Cancel 716.

As described hereinabove, the present invention solves many problems associated with previous type methods and implementations. However, it will be appreciated that various changes in the details, materials and arrangements of parts which have been herein described and illustrated in order to explain the nature of the invention may be made by those skilled in the are within the principle and scope of the invention will be expressed in the appended claims.

The invention claimed is:

1. A system for storing of print job data comprising:
   means for acquiring, into a controller associated with a plurality of associated rendering devices, print job data representative of a desired print job, which print job data is comprised of a page description language format associated with a selected printer device and appended printer job language parameter data corresponding to a controller cabinet storage instruction and at least one selected document output parameter associated with the page description language, the at least one document output parameter including a document finishing setting including stapling number of copies or hole-punch;
   parsing means for parsing the parameter data to extract the cabinet
   storage instruction and the at least one document output parameter;
   converting means associated with the controller for converting acquired print job data into bitmapped image data;

means for generating a printout from a rendering device having a smallest job queue associated therewith in accordance with an output of the controller in accordance with the at least one document output parameter parsed from the parameter data;

means for receiving storage location data corresponding to a selected cabinet from a plurality thereof corresponding to a source of the print job data;

storage means for selectively storing the print job data in the page description format in a selected storage location of the controller contemporaneously with the parameter data associated therewith in accordance with the cabinet storage instruction parsed from the parameter data;

means for acquiring print status information including data representative of name associated with the print job data and data representative of a size of the print job data;

the storage means including means for selectively storing the print status information associatively with the print job data;

means for receiving a cabinet access instruction;

testing means for testing identification data corresponding to the received cabinet access instruction;

means for selectively communicating the print job data to generate an image corresponding thereto on an associated display device in accordance with an output of the testing means indicative of authorization to access a cabinet indicated by the cabinet access instruction, the print job data corresponding to the print job data stored in the page description format in the storage location;

means for receiving selection data in accordance with the image from the associated display device, which selection data includes an instruction to commence at least a second rendering of associated print job information stored in the page description format;

means for receiving edit data corresponding to selected edits to the stored parameter data;

the converting means including means for completing a second conversion of the print job information stored in the page description format to the bitmapped image data; and means for selectively communicating the bitmapped image data of the second conversion of print job data to the selected printer device to obtain a subsequent printout thereof in accordance with the stored parameter data and received edits thereto.

2. The system for storing of print job data of claim 1 wherein the storage means comprise multiple storage locations for storing the print job data.

3. The system for storing print job data of claim 2 further comprising selection means for selecting the storage location to store the print job data.

4. The system for storing print job data of claim 3 wherein the selection means comprise means for storing selection data which pre-authorizes selection of a specified storage location for storing print job data.

5. The system for storing print job data of claim 3 wherein the selection means include:

means for prompting an associated user for selection data to select the storage location to store print job data associated with the user;

means for receiving user selection data resultant from a prompt of the user for the storage location to store print job data associated with the user; and means for storing the print job data in the storage location in accordance with the user selection data.

6. The system for storing print job data of claim 1 further comprising means for selecting parameters for the desired print job.

7. The system for storing print job data of claim 6 wherein the parameters which are selected include number of copies, finishing options, and merging of two print jobs.

8. The system for storing print job data of claim 1 further comprising means for performing raster image processing on the print job.

9. A method for storing of print job data comprising the steps of:

acquiring, into a controller associated with a plurality of associated rendering devices, print job data representative of a desired print job, which print job data is comprised of a page description language format associated with a selected printer device and appended printer job language parameter data corresponding to a controller cabinet storage instruction and at least one selected document output parameter associated with the page description language, the at least one document output parameter including a document finishing setting including stapling number of copies or hole-punch;

parsing the parameter data to extract the cabinet storage instruction and the at least one document output parameter;

converting, via the controller, acquired print job data into bitmapped image data;

generating a printout from a rendering device having a smallest job queue associated therewith in accordance with an output of the controller in accordance with the at least one document output parameter parsed from the parameter data;

receiving storage location data corresponding to a selected cabinet from a plurality thereof corresponding to a source of the print job data;

selectively storing the print job data in the page description format in a selected storage location of the controller contemporaneously with the parameter data associated therewith in accordance with the cabinet storage instruction parsed from the parameter data;

acquiring print status information including data representative of a name associated with the print job data and data representative of a size of the print job data;

selectively storing the print status information associatively with the print job data;

receiving a cabinet access instruction;

testing identification data corresponding to the received cabinet access instruction;

selectively communicating the print job data to generate an image corresponding thereto on an associated display device in accordance with an output of the testing indicative of authorization to access a cabinet indicated by the cabinet access instruction, the print job data corresponding to the print job data stored in the page description format in the storage location;

receiving selection data in accordance with the image from the associated display device, which selection data includes an instruction to commence at least a second rendering of associated print job information stored in the page description format;

receiving edit data corresponding to selected edits to the stored parameter data;

completing a second conversion of the print job information stored in the page description format to the bitmapped image data; and selectively communicating the bitmapped image data of the second conversion of print job data to the selected printer device to obtain a subsequent printout thereof in accordance with the stored parameter data and received edits thereto.

10. The method for storing of print job data of claim 9 wherein the storage medium comprises multiple storage locations for storing the print job data.

11. The method for storing print job data of claim 10 further comprising the step of selecting the storage location to store the print job data.

12. The method for storing print job data of claim 11 wherein the step of selecting the storage location comprises storing selection data which pre-authorizes selection of a specified storage location for storing print job data.

13. The method for storing print job data of claim 11 wherein the step of selecting the storage location comprises the steps of:

prompting an associated user for selection data to select the storage location to store print job data associated with the user;

receiving user selection data resultant from a prompt of the user for the storage location to store print job data associated with the user; and storing the print job data in the storage location in accordance with the user selection data.

14. The method for storing print job data of claim 9 further comprising the step of selecting parameters for the desired print job.

15. The method for storing print job data of claim 14 wherein the parameters which are selected include number of copies, finishing options, and merging of two print jobs.

16. The method for storing print job data of claim 9 further comprising the steps of performing raster image processing on the print job and printing the print job.

* * * * *